March 10, 1931.   K. MURCK   1,795,344
PAPER DEVELOPING APPARATUS
Filed Jan. 11, 1929   2 Sheets-Sheet 2

Knud Murck   Inventor
By his Attorney

Patented Mar. 10, 1931

1,795,344

UNITED STATES PATENT OFFICE

KNUD MURCK, OF FOREST HILLS, NEW YORK, ASSIGNOR TO CHARLES BRUNING COMPANY, INC., A CORPORATION OF NEW YORK

PAPER-DEVELOPING APPARATUS

Application filed January 11, 1929. Serial No. 331,886.

This invention relates to improvements in machines for developing sensitized papers of the kind which may be developed by exposure to ammonia fumes or by other like or similar methods.

The object of the invention is to provide a generally improved machine whereby sensitized papers may be developed quickly and automatically and embodying certain features of simplicity and adjustability whereby to provide an efficient machine.

As is well known in the art, a print is made from an original and the print is developed into a positive by exposure to vapors or fumes.

In the accompanying drawings

Figure 1:
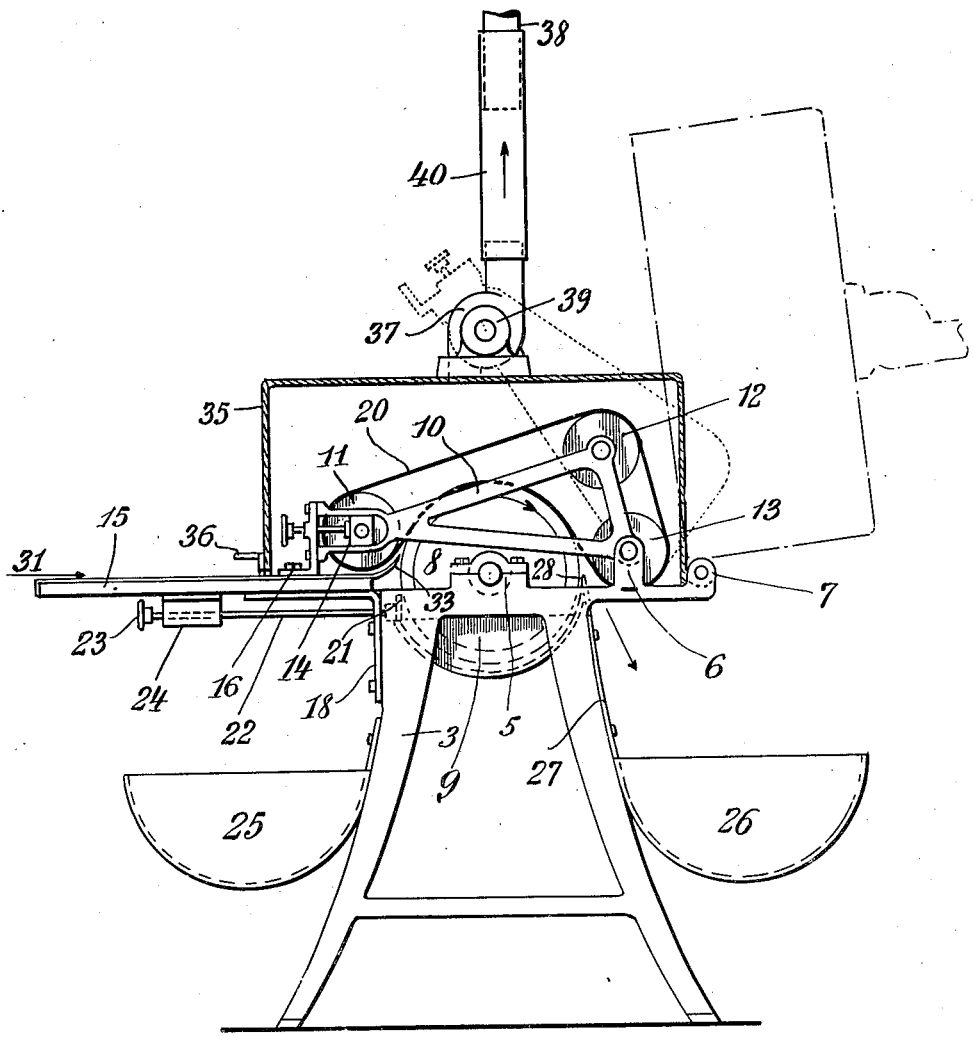
Figure 1 is an end view of a machine embodying the invention with certain parts in section and certain parts omitted.
Figure 2:
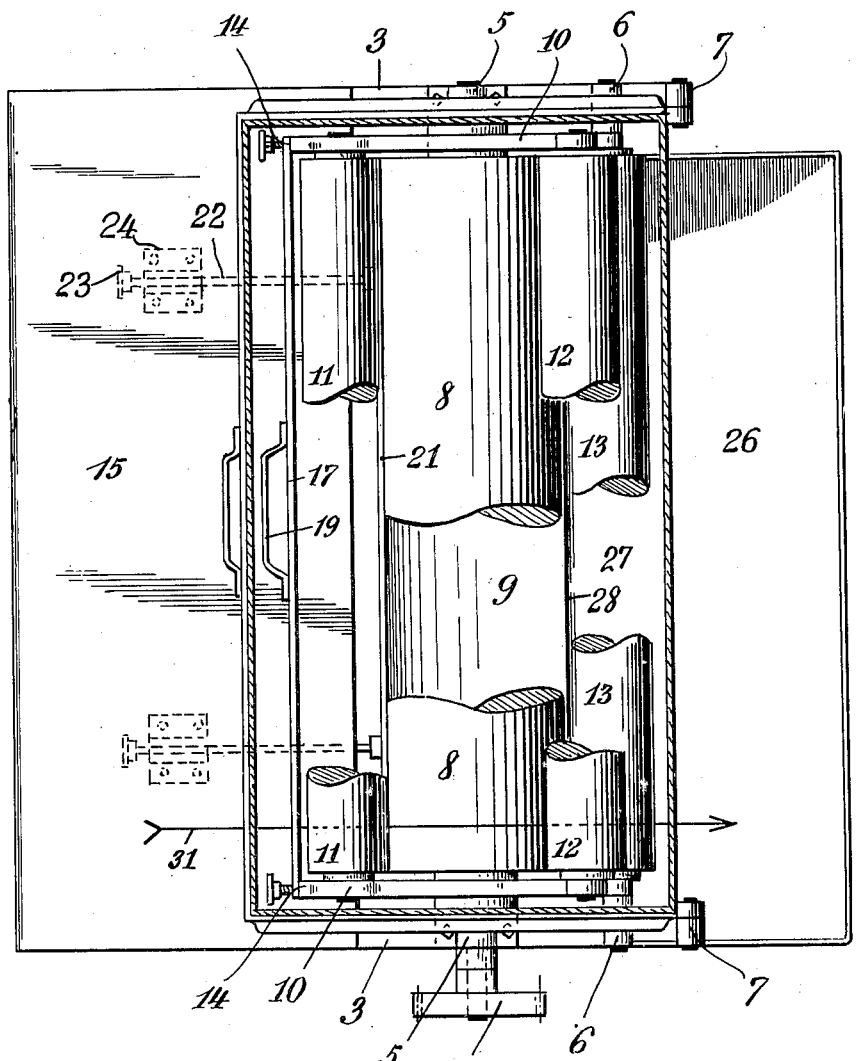
Figure 2 is a plan view with parts in section.

The machine comprises a pair of end frames 3, 3 which form three bearings 5, 6 and 7. In the main bearings 5 there is supported a rubber roller 8, preferably consisting of a suitable core covered with a layer of rubber. Below the roller 8 there is supported a trough 9 which is shaped to fit the roller. In the second bearing 6 there is pivoted at each end an idler roller frame 10. The two frames 10 support between them three idler rollers 11, 12 and 13. The roller 11 is mounted in adjustable bearings 14. Each frame 10 is detachably secured to a feed board 15 by bolts as 16, Figure 1. The feed board is supported on the main frames by means of brackets as 18. The idler frames are joined by a cross bar 17, Figure 2, to which is secured a handle 19. A rubber belt 20, omitted in Figure 2, passes over the idler rollers and in contact with the main roller 8.

The numeral 21 denotes a scraper blade which extends along the main roller and which may be adjusted by rods 22 having turning knobs 23. The rods are supported in bearings 24 under the feed board.

The numeral 25 denotes a trough for the reception of paper, and at the rear of the machine there is supported a delivery trough 26 which receives the finished print. It will be noted that preferably the wall 27 of the delivery trough extends up to the trough 9 and joins the wall thereof in an edge 28 over which the paper passes from the roller 8.

The trough 9 is filled with ammonia and when the machine is started as by power applied to a gear 30, the roller 8 is rotated and drives the belt 20. The print is fed into the machine in the direction of the arrow 31 in Figures 1 and 2 and is guided upwards and in between the roller 8 and the belt 20 by a curved guide 33. The print then passes over the roller 8 and out into the trough 26.

The rubber roller 8 carries on its surface a film of ammonia sufficient to develop the print. The amount of moisture required is regulated by adjusting the scraper 21.

In order to protect the operator against the ammonia fumes, there is pivoted in the third bearing 7 a hood 35 which fits over and encloses the machine. The hood carries a handle 36. On top of the hood there is mounted a fan 37 for carrying off the fumes through an outlet pipe 38. 39 is a small motor for driving the fan.

The outlet pipe is fitted with a slidable sleeve section 40. By sliding the latter up on the pipe 38, the hood 35 may be swung back with the motor and fan, and also the idler frames with the rollers and the rubber belt may be swung back as shown in dotted lines in Figure 1 for purposes of inspection, repair and cleaning.

The bolts 16 will of course be removed before the frames 10 may be swung back. The machine may be made in any suitable dimensions for handling any size prints. It has been found that the rubber roller because of its surface carries very little ammonia, just sufficient to barely moisten the print so as to develop it. The scraper 21 also serves in a measure to prevent the formation of drops or spots of excessive moisture on the roller. The machine is wholly automatic and the prints pass through it quickly and are delivered fully developed.

I claim:

1. A machine of the character described comprising a supporting framework, a roller mounted therein, a trough containing ammonia disposed beneath said roller and substantially encircling the lower half thereof, a plurality of idler rollers, an endless belt thereon, a frame for supporting said idler rollers and belt, means in said frame for tightening the belt, means for supporting said frame in swingable relation to the said framework, means for securing said frame with the said idler rollers and belt in fixed operative relation to the said first named roller whereby a portion of the belt contacts with the roller, a pivoted swingable hood mounted on said framework and adapted to cover the aforesaid elements and means for operating the said roller.

2. A machine of the character described comprising a supporting framework, a roller mounted therein, a trough containing ammonia disposed beneath said roller and substantially encircling the lower half thereof, a scraper adjustably mounted to contact with said roller at the edge of the trough, a plurality of idler rollers, an endless belt thereon, a frame for supporting said idler rollers and belt, means in said frame for tightening the belt, means for supporting said frame in swingable relation to the said framework, means for securing said frame with the said idler rollers and belt in fixed operative relation to the said first named roller whereby a portion of the belt contacts with the roller, a pivoted swingable hood mounted on said framework and adapted to cover the aforesaid elements, an outlet pipe communicating with said hood, a motor on the latter for drawing off the gases developed by the ammonia within the hood, means in said outlet pipe for temporarily disconnecting it from the hood to permit the latter to be swung away from the operating elements of the machine and means for operating the said roller.

KNUD MURCK.